Sept. 28, 1937.  O. C. SCHERFEL  2,094,500

JOINT FOR WIRE FABRICS

Filed Aug. 5, 1936

INVENTOR
Otto Carl Scherfel.
BY
ATTORNEY

Patented Sept. 28, 1937

2,094,500

UNITED STATES PATENT OFFICE 2,094,500

JOINT FOR WIRE FABRICS

Otto Carl Scherfel, Haddon Heights, N. J., assignor to Audubon Wire Cloth Corporation, Philadelphia, Pa., a corporation of New Jersey Application August 5, 1936, Serial No. 94,491

8 Claims. (Cl. 245—6)

My invention relates to belt structures made of wire fabric comprising helically coiled wires arranged in interlaced and/or interconnected condition with their ends suitably connected together, and the object of my present invention is to provide a simple and effective connection for joining sections of fabric made up of helically coiled wires of different or opposite twist.

In the construction of wire belt fabric made of helically coiled wires one practice has been to provide what is termed a sectional belt, that is to say, a belt made up of sections of helically coiled wires of one twist alternating with sections of helically coiled wires of a different or opposite twist. In the construction of these belts, it is necessary to provide connecting means between meeting ends of the different sections, and in providing these connections it is quite essential that there be no impairment of the flexibility of the fabric and additionally that there be no change in the planes of the surfaces in order that there shall be no impairment of the carrying surface or the surface which contacts with the pulleys or drums over which the belt passes.

My invention comprises the use of a pair of cross connector wires or rods which extend transversely of the belt fabric at the junction of the sections, and the association therewith of pairs of the transversely arranged helically coiled wires of each section; the wires of alternating sections being twisted in opposite directions.

These and other features of my invention are more fully described hereinafter; reference being had to the accompanying drawing, in which.

Figure 1:
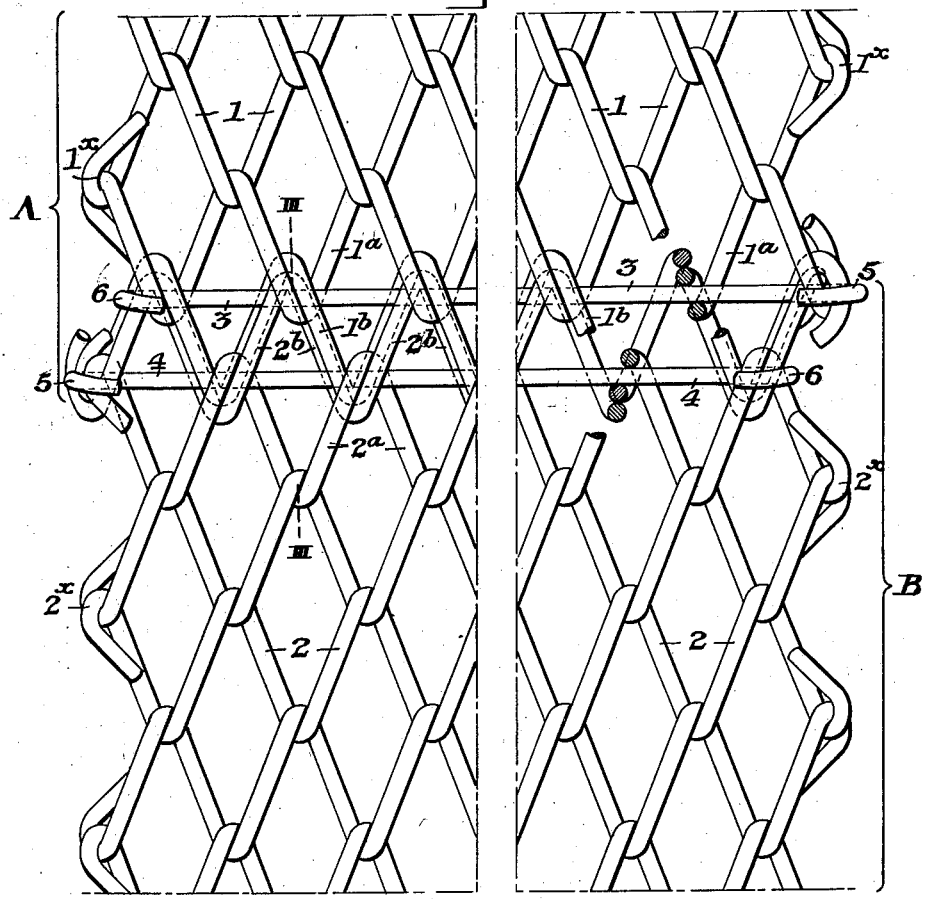
Figure 1 is a plan view, partly broken away, illustrating the application of my improved connector wires between sections of helically coiled wires of different twist.
Figure 2:
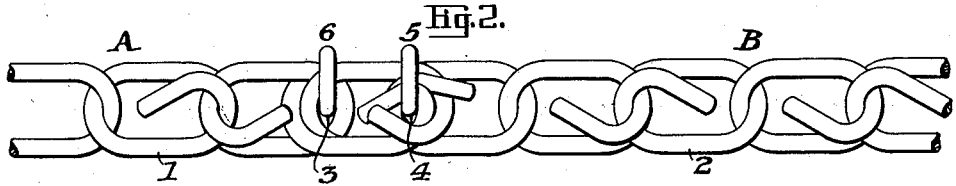
Fig. 2 is an edge view of the adjacent sections joined by my improved connecting means.
Figure 3:
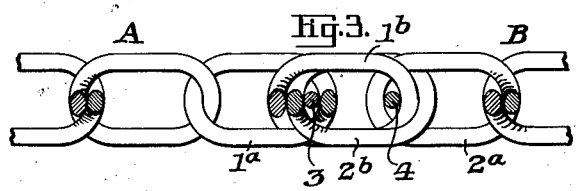
Fig. 3 is a sectional view on the line III—III, Fig. 1.

My improved joint for the connection of sections of transversely arranged helically coiled wires wherein each section has wires of a twist differing from that of the adjacent sections comprises the employment of two cross connecting wires or rods, each of which cross wires or rods is engaged by a helically coiled wire of each section—that is to say each cross wire or rod is engaged by a helical wire of one twist, the right-hand twist for instance, of one section, and by a helical wire of opposite twist, the left-hand twist for instance, of the next section—the end wires of each section nesting one within the other so as to bring the bights of the respective nested wires in registering position—permitting the insertion of the cross connector wires or rods.

In the drawing, the section indicated generally at A is made up of interconnected helically coiled wires 1 of one twist, in the present instance of right-hand twist, and the section indicated generally at B is made up of interconnected helically coiled wires 2 of opposite twist, in the present instance left-hand twist. The ends of these helically coiled wires are suitably connected and these connections may be of the usual knuckled type indicated at $1^x$ and $2^x$, respectively.

In forming the connection between the helically coiled wires of these sections A and B, cross connector rods or wires 3 and 4 are employed and the ends of the same may be bent back inwardly in suitable position with respect to the connected ends of a pair of the helically coiled wires in one instance as indicated at 5, and in suitable position with respect to the interconnecting bights of a pair of helically coiled wires in the other instance, as indicated at 6.

The two helically coiled transversely arranged wires at the end of the section A adjacent to and/or forming part of the joint or connection are indicated at $1^a$ and $1^b$, and the two helically coiled transversely arranged wires at the end of the section B adjacent to and/or forming part of the joint or connection are indicated at $2^a$ and $2^b$.

The bights at one side of the helically coiled wire $1^a$ directly engage the cross connector wire or rod 3, while the bights at one side of the helically coiled wire $2^a$ directly engage the cross connector wire or rod 4.

The bights at one side of the helically coiled wire $1^b$ directly engage the cross connector wire 4, while the bights at one side of the helically coiled wire $2^b$ directly engage the cross connector wire 3.

The bights at the opposite side of the helically coiled wires $1^b$ overlie the cross connector wire or rod 3 and they also overlie the bights of the helically coiled wires $2^b$ which directly engage the cross connector wire or rod 3.

The bights at the opposite side of the helically coiled wires $2^b$ overlie the cross connector wire or rod 4 and they also overlie the bights of the helically coiled wires $1^b$ which directly engage the cross connector wire or rod 4.

By reason of the arrangement of the cross connecting wires or rods 3 and 4 with pairs of the helically coiled end wires of each section in the manner indicated and the fact that the connections for the ends of the helically coiled wires at the marginal edges of the fabric are in staggered relation; one end of each cross connector rod or wire will be associated with and engage the knuckled connection of three of the helically coiled wires at the marginal edges of the belt as indicated at 5, while its opposite end will engage the interconnected bights of three of the helically coiled wires adjacent to the opposite marginal edges of the belt as indicated at 6; that is to say, the ends of the cross connector rods or wires 3 will engage the knuckled connection of the helically coiled wires 1ª, 1ᵇ and 2ᵇ at one edge or margin of the belt, and the interconnected bights of the same wires at or adjacent to the opposite edge or margin of the belt. In like manner, the ends of the cross connector rods or wires 4 will engage the knuckled connection of the helically coiled wires 2ª, 2ᵇ and 1ª at one edge or margin of the belt and the interconnected bights of the same wires at or adjacent to the opposite edge or margin of the belt. In addition, one end of helically coiled wire 2ᵇ will be bent around the connector rod or wire 3 inside the knuckled connection for the ends of the wires 1ª and 1ᵇ through which said wire 3 passes, adjacent to the connection 5 at the right hand side of the connection, and one end of wire 1ᵇ will be bent around the wire 4 inside the knuckled connection for the ends of the wires 2ª and 2ᵇ through which said wire 4 passes, adjacent to the connection 5 at the left hand side of the connection.

By reason of the fact that two cross connector rods or wires are employed to form the joint, the latter is much stronger than any joint made with a single cross connector rod or wire, since each of said cross connector rods or wires is directly engaged by a helically coiled wire of each section, and indirectly engaged by another helically coiled wire of each section. At the same time there is no thickening of the belt at the joint, and my improved connection provides the same even planes on both surfaces present in the rest of the belt structure.

In the ordinary connections for belt structures made up of sections of helically coiled wires of different twist employing single cross rod or wire connectors, such single connectors pass through single helically coiled wires of each section which are brought into nested relation at the meeting ends of the sections and in such arrangement the edges or margins of one set of sections are offset with respect to the edges of the alternating adjacent sections to the extent of substantially one-half of each diamond mesh. This arrangement, as may be readily understood, gives the edges of the belt irregular margins. By the use of the form of connection which I have devised, the knuckled connections for the helically coiled wires are in complete alignment throughout the entire extent of the belt, as clearly indicated by the drawing.

It will be understood of course, that modifications may be made in the arrangement of the cross connector wires or rods and the association therewith of the helically coiled wires at the meeting ends of the respective sections of belt fabric without departing from the spirit of my invention; all of which is deemed to be within the scope of the appended claims.

I claim:

1. A joint for connecting sections of belt fabric made up of transversely arranged helically coiled wires and in which sections having wires of right-hand twist alternate with sections having wires of left-hand twist, comprising a pair of cross connector rods or wires in parallel relation associated with pairs of helically coiled wires at the end of each section of the belt fabric; each of said pairs of helically coiled end wires being in direct engagement with one of said cross connector rods or wires.

2. A joint for connecting sections of belt fabric made up of transversely arranged helically coiled wires and in which sections having wires of right-hand twist alternate with sections having wires of left-hand twist, comprising a pair of cross connector rods or wires in parallel relation associated with pairs of helically coiled wires disposed in nested relation at the meeting ends of the sections of the belt fabric; each wire of each pair of helically coiled end wires being in direct engagement with one of said cross connector rods or wires.

3. A joint for connecting sections of belt fabric made up of transversely arranged helically coiled wires and in which sections having wires of right-hand twist alternate with sections having wires of left-hand twist, comprising a pair of cross connector rods or wires in parallel relation associated with pairs of the helically coiled wires at the end of each section of the belt fabric; each of said pairs of helically coiled end wires being in direct engagement with one of said cross connector rods or wires with the coils of one of the end wires of each section overlying the coils of an end wire of the other section.

4. A joint for connecting sections of belt fabric made up of transversely arranged helically coiled wires and in which sections having wires of right-hand twist alternate with sections having wires of left-hand twist, comprising a pair of cross connector rods or wires in parallel relation associated with pairs of the helically coiled wires disposed in nested relation at the meeting ends of the sections of the belt fabric; each wire of each pair of helically coiled end wires being in direct engagement with one of said cross connector rods or wires with the coils of one of the end wires of each section overlying the coils of an end wire of the other section.

5. A joint for connecting sections of belt fabric made up of transversely arranged helically coiled wires and in which sections having wires of right-hand twist alternate with sections having wires of left-hand twist, comprising a pair of cross connector rods or wires in parallel relation associated with pairs of the helically coiled wires at the end of each section of the belt fabric; each of the helically coiled end wires lying in nested relation and each wire of each pair of helically coiled end wires being in direct engagement with one of said cross connector rods or wires and the coils of each helically coiled end wire of each section overlying the coils of a helically coiled end wire of the other section.

6. A joint for connecting sections of belt fabric made up of transversely arranged helically coiled wires and in which sections having wires of right-hand twist alternate with sections having wires of left-hand twist, comprising a pair of cross connector rods or wires associated with pairs of the helically coiled wires in parallel relation at the end of each section of the belt fabric; each of the helically coiled end wires lying in nested relation and each cross connector rod or wire being in direct engagement with one of the helically coiled wires of each section and in indirect engagement with another helically coiled wire of each section.

7. A joint for connecting sections of belt fabric made up of transversely arranged helically coiled wires and in which sections having wires of right-hand twist alternate with sections having wires of left-hand twist, comprising a pair of cross connector rods or wires in parallel relation associated with pairs of helically coiled end wires of each section of the belt structure; each wire of said pair of helically coiled end wires being in engagement with one of said cross connector rods or wires and one of the helically coiled wires of each pair of end wires having its coils overlying coils of the oppositely twisted helically coiled wire in engagement with a cross connector rod or wire.

8. A joint for connecting sections of belt fabric made up of transversely arranged helically coiled wires and in which sections having wires of right-hand twist alternate with sections having wires of left-hand twist, comprising a pair of cross connector rods or wires in parallel relation associated with pairs of helically coiled end wires of each section of the belt structure at their meeting ends; one wire of each pair of helically coiled end wires being in direct engagement with one of said cross connector rods or wires and one wire of each pair of helically coiled end wires being in indirect engagement with said cross connector wires by having its coils overlying coils of the oppositely twisted helically coiled wire in direct engagement with a cross connector rod or wire.

OTTO CARL SCHERFEL.